US008670068B2

(12) United States Patent
Hsiung

(10) Patent No.: US 8,670,068 B2
(45) Date of Patent: Mar. 11, 2014

(54) PROTECTIVE COVER, CAMERA MODULE, AND ELECTRONIC DEVICE EMPLOYING THE SAME

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 322 days.

(21) Appl. No.: 13/149,863

(22) Filed: May 31, 2011

(65) Prior Publication Data

US 2012/0229700 A1   Sep. 13, 2012

(30) Foreign Application Priority Data

Mar. 9, 2011   (CN) .......................... 2011 1 0056000

(51) Int. Cl.
*H04N 5/225* (2006.01)
*H04N 5/222* (2006.01)
*H04M 1/00* (2006.01)

(52) U.S. Cl.
USPC .................. 348/374; 348/371; 455/575.8

(58) Field of Classification Search
USPC .............. 348/370, 371, 373–376; 455/556.1, 455/556.2, 575.1, 575.8
See application file for complete search history.

(56) References Cited

U.S. PATENT DOCUMENTS

| | | | |
|---|---|---|---|
| 7,117,011 B2 * | 10/2006 | Makino | 455/556.1 |
| 7,195,362 B2 * | 3/2007 | Kumagai | 362/12 |
| 7,346,196 B2 * | 3/2008 | Gin | 382/118 |
| 7,927,028 B2 * | 4/2011 | Chan | 396/448 |
| 8,130,312 B2 * | 3/2012 | Hiltunen et al. | 348/371 |
| 2003/0062413 A1 * | 4/2003 | Gardiner et al. | 235/454 |
| 2010/0157141 A1 * | 6/2010 | Ouyang | 348/371 |
| 2011/0050986 A1 * | 3/2011 | Wang | 348/371 |
| 2012/0218458 A1 * | 8/2012 | Pavithran et al. | 348/345 |

* cited by examiner

*Primary Examiner* — Daniel M Pasiewicz
(74) *Attorney, Agent, or Firm* — Altis Law Group, Inc.

(57) ABSTRACT

An electronic device includes a housing, a circuit board, and a camera module. The camera module includes a camera unit, a flash device, and a protective cover. The camera unit records and stores images, and the protective cover protects the camera unit and the flash device. The protective cover includes an opening, a light hole, and a separation portion located between the opening and the light hole. The light from the flash device is diffused and passes through the light hole. The camera unit and the flash device are separated by the separation portion to prevent the light of the flash device from entering camera unit through the opening.

12 Claims, 6 Drawing Sheets

PROTECTIVE COVER, CAMERA MODULE, AND ELECTRONIC DEVICE EMPLOYING THE SAME

BACKGROUND

1. Technical Field

The disclosure generally relates to cover structures, and more particularly to a protective cover, and a camera module and an electronic device employing the same.

2. Description of the Related Art

Built-in camera modules are widely used in different electronic devices, such as mobile phones. To get a better result, corresponding flash modules are used in the electronic devices to match the camera modules.

Referring to FIG. 6, a conventional camera module 200 generally includes a camera 220 and a flash unit 240, which are adjacently located on and is electrically connected to a motherboard 300. The camera 220 includes a camera lens 222, and the flash unit 240 includes a flash bulb 242 used as an auxiliary light source to increase light for the camera lens 222. However, the flash bulb 242 may emit hard light because the camera lens 222 and the flash bulb 242 are located close to each other, causing overexposure of the camera lens 222, which may decrease the operating life of the camera lens 222.

Therefore, there is room for improvement within the art.

BRIEF DESCRIPTION OF THE DRAWINGS

Many aspects of an exemplary protective cover, camera module, and electronic device employing the same can be better understood with reference to the following drawings. The components in the drawings are not necessarily drawn to scale, the emphasis instead being placed upon clearly illustrating the principles of the exemplary protective cover, and camera module and electronic device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
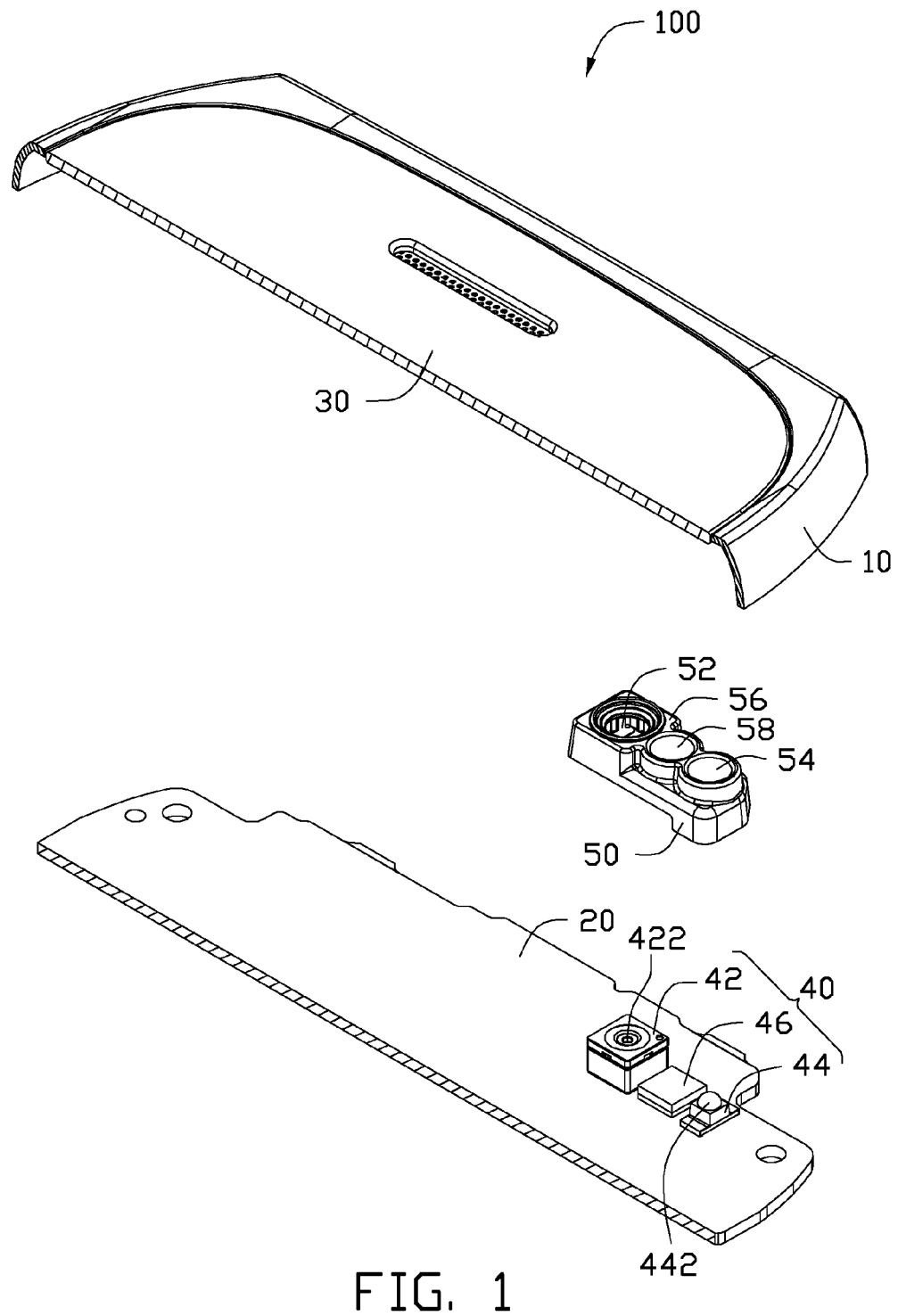
FIG. 1 is a schematic and exploded view of one embodiment of an electronic device including a protective cover.

FIG. 1 shows an exploded view of one embodiment of an electronic device 100 including a protective over 50. The electronic device 100 can be a mobile phone or a personal digital assistant. The mobile phone is taken here as an example to illustrate the disclosure.

The electronic device 100 further includes a housing 10, a circuit board 20, a window plate 30, and a camera module 40. In one embodiment, the housing 10 can be a partial cover of the electronic device 100. The circuit board 20 can be a motherboard of the electronic device 100 and is received within the housing 10. The circuit board 20 is capable of holding many electronic components of the electronic device 100, while providing supports and connections for the electronic components.

The camera module 40 includes a camera unit 42, a flash device 44, and a light intensity sensor 46. The camera unit 42 is located on and is electrically connected to the circuit board 20, and is capable of recording and storing images, which may be moving images or still photographs such as videos or pictures. The camera unit 42 includes a camera lens 422. The camera lens 422 is capable of making images of objects either on photographic film or on other media capable of storing an image chemically or electronically.

The flash device 44 is located at and is electrically connected to the circuit board 20, and includes a flash unit 442. The flash unit 442 is used in photography to produce a flash of artificial light to illuminate a dark scene and capture quickly moving objects or change the quality of light.

The light intensity sensor 46 is located between the camera unit 42 and the flash device 44 and is capable of sensing light intensity of ambient light. In one embodiment, when the light intensity sensor 46 detects and finds that the light intensity of ambient light is less than a predetermined light intensity of the electronic device 100, the flash unit 442 is automatically activated and enabled to provide and adjust light for the camera unit 42 and illuminate a dark scene.

Figure 2:
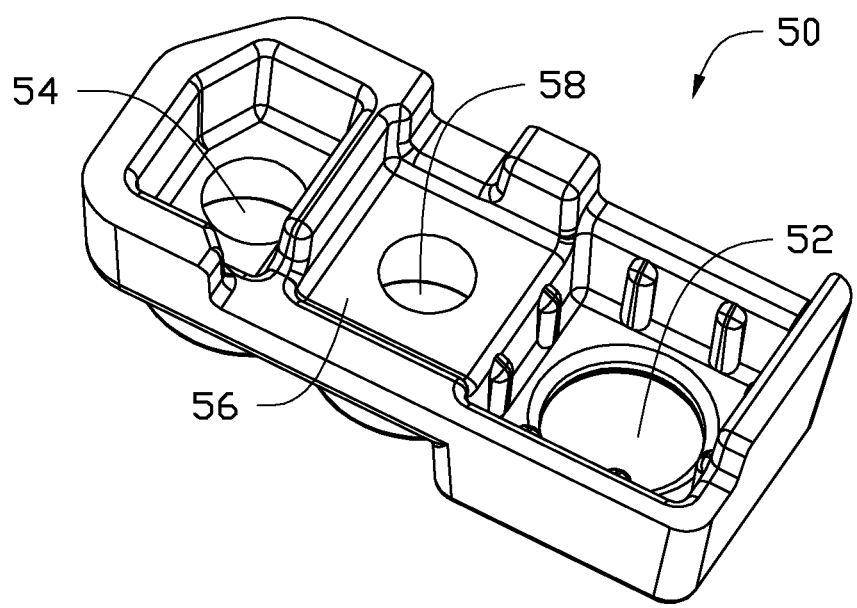
FIG. 2 is a schematic view of the protective cover of the electronic device shown in FIG. 1 of the disclosure.
Figure 3:
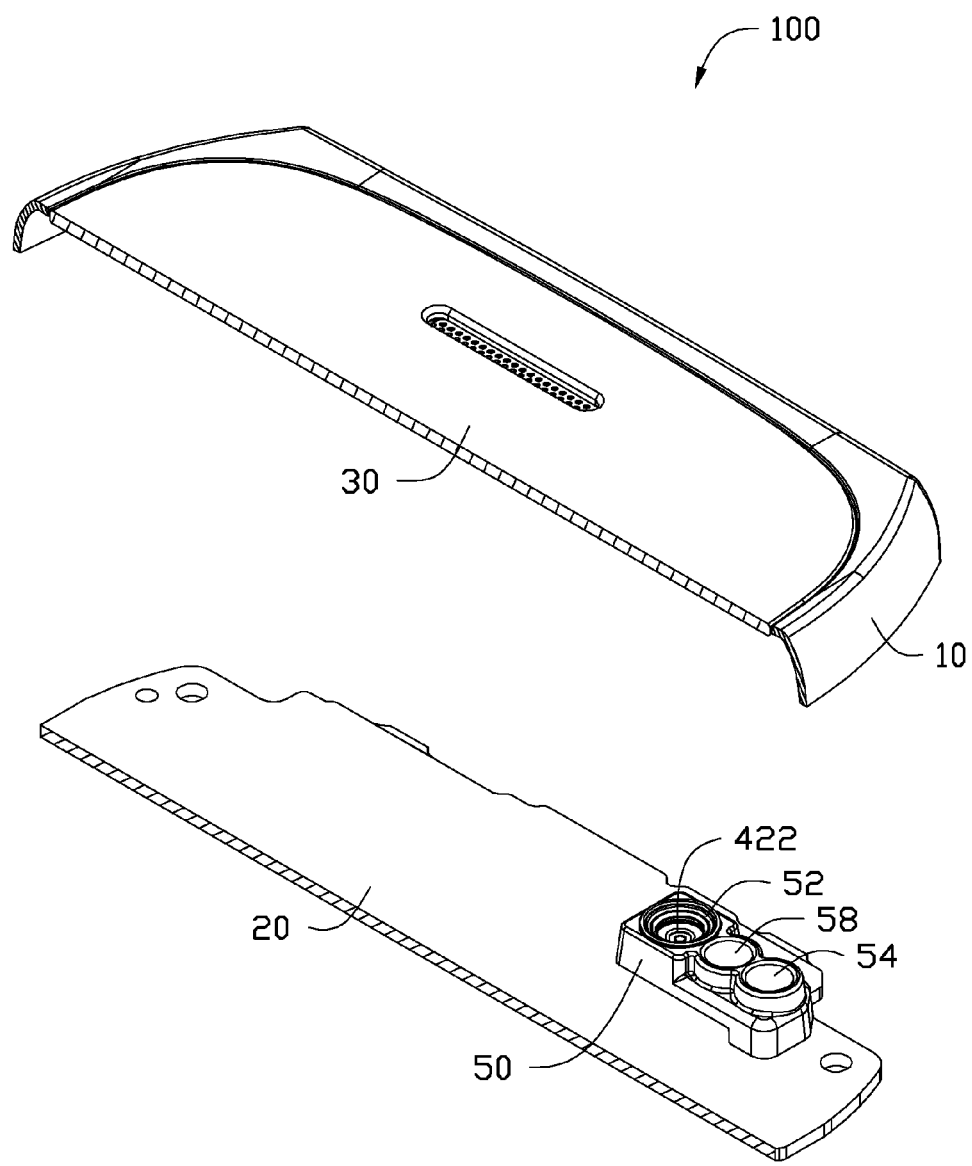
FIG. 3 is a partially assembled view of the electronic device shown in FIG. 1 of the disclosure.
Figure 5:
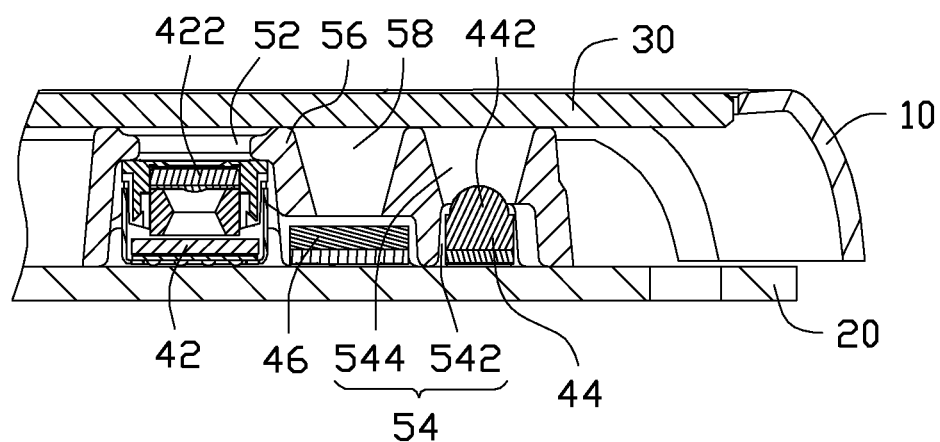
FIG. 5 is an assembled cross-sectional view taken along line V-V of FIG. 4 of the disclosure.
Figure 6:
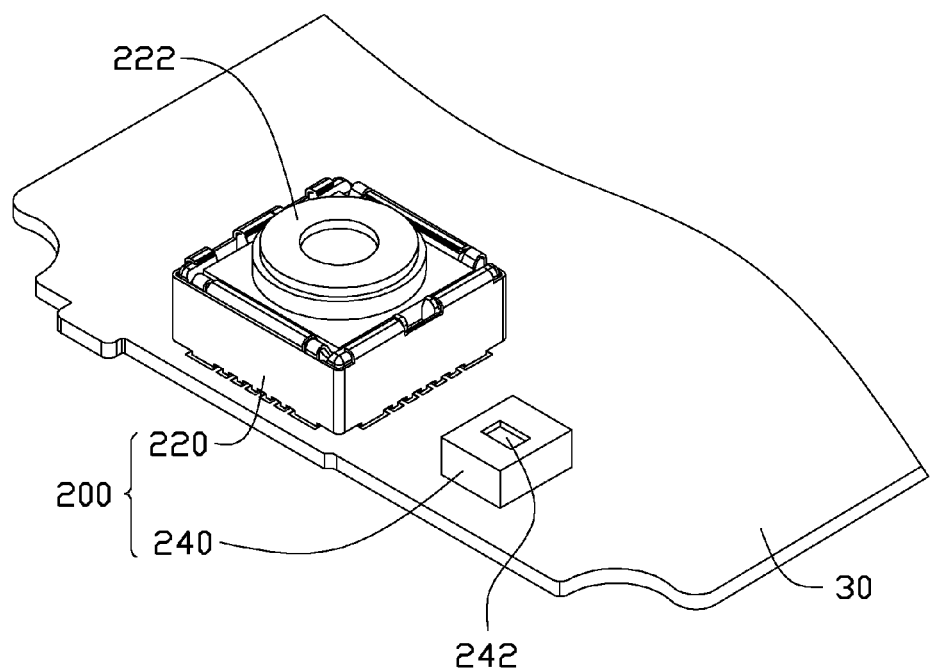
FIG. 6 is a schematic view of a conventional camera module.

Also referring to FIGS. 2 and 5, the protective cover 50 can be made from rubber. The protective cover 50 includes an opening 52 and a light hole 54 defined at two opposite ends. The protective cover 50 further includes a separation portion 56 located between the opening 52 and the light hole 54. The opening 52 allows light to enter. The camera lens 422 is positioned in the opening 52 to gather the incoming light.

The light hole 54 includes a receiving space 542 and a through hole 544 formed at the bottom of the receiving space 542. The receiving space 542 receives the flash device 44. The through hole 544 communicates with the receiving space 542 and is substantially a hollow trumpet-shaped hole with its opening facing toward the window plate 30. The through hole 544 is capable of transferring and diffusing the light from the flash unit 442.

The separation portion 56 separates the opening 52 and the light hole 54 to prevent excessive light from the flash device 44 entering the opening 52, thereby further preventing the camera lens 422 from overexposure. The protective cover 50 further defines a positioning hole 58 passing through the separation portion 56. The light intensity sensor 46 is aligned with the positioning hole 58 and is partially exposed from the positioning hole 58.

Figure 4:
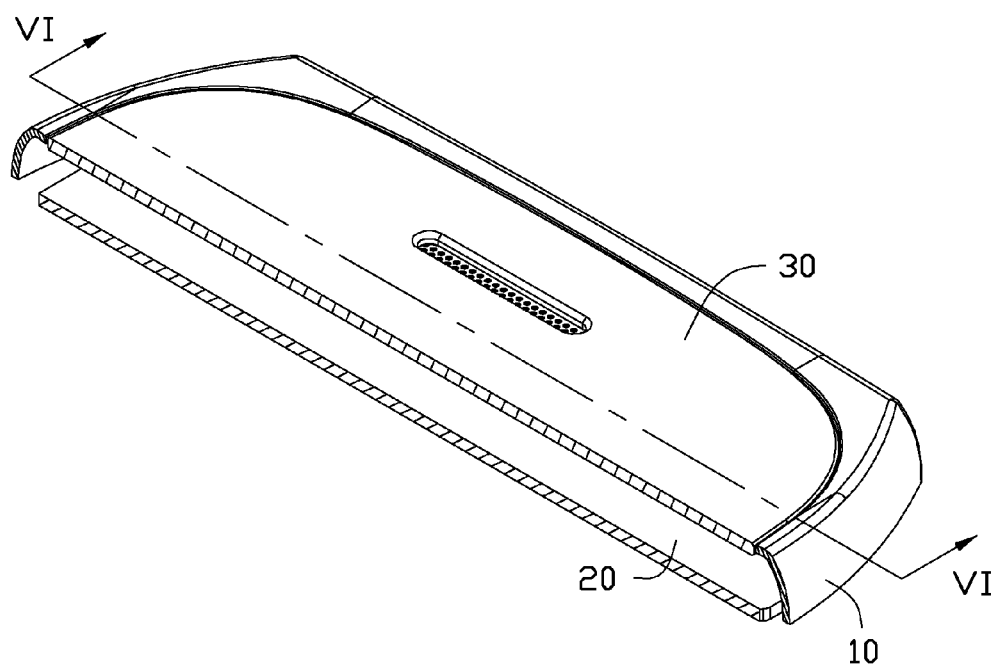
FIG. 4 is an assembled view of the electronic device shown in FIG. 1 of the disclosure.

Referring to FIGS. 2, 4, and 5, in assembly, the camera unit 42, the light intensity sensor 46 and the flash device 44 are detachably assembled to the circuit board 20 and are electrically connected to the circuit board 20 to form the camera module 40. The camera unit 42, the light intensity sensor 46, and the flash device 44 are aligned with and are received within the opening 52, the positioning hole 58, and the receiving space 542 respectively. Thus, the flash unit 442 and the camera lens 422 are separated by the light intensity sensor 46. The housing 10 covers the circuit board 20, the protective cover 50, and the camera module 40. The window plate 30 resists against the protective cover 50. Hence, the camera module 40 is assembled to the circuit board 20, and the protective cover 50 is secured and is held between the circuit board 20 and the window plate 30.

In summary, the light intensity sensor 46 can automatically detect light intensity of ambient light to determine whether to activate the flash device 44 or not. When the flash device 44 is activated, the flash unit 442 provides and adjusts to the ambient light, and the light is diffused through the through hole 544 of the light hole 54 to illuminate a dark scene. Moreover, the flash unit 442 and the camera lens 422 is insulated by the separation portion 56, so the light from the flash unit 442 cannot directly irradiate the camera lens 422, thereby preventing the camera lens from overexposure.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A camera module comprising:
a camera unit for recording and storing images;
a flash device for providing light; and
a protective cover for protecting the camera unit and the flash device, the protective cover comprising:
an opening capable of receiving the camera unit and gathering incoming light;
a light hole comprising a receiving space and a through hole defined at the bottom of the receiving space and communicating with the receiving space, the flash device latched in and surrounded by the receiving space and partially exposed from the through hole, the through hole defined by two opposite bevel edges, the two opposite bevel edges transferring and diffusing the light from the flash unit; and
a separation portion located between the opening and the light hole, wherein the light from the flash device is diffused and passes through the light hole, the camera unit and the flash device are spaced and separated by the separation portion to prevent the light of the flash device from entering the camera unit via the opening;
wherein the camera module further comprises a light intensity sensor located between the camera unit and the flash device, the protective cover further defines a positioning hole passing through the separation portion, and the positioning hole is aligned with the light intensity sensor and is partially exposed from the positioning hole.

2. The camera module as claimed in claim 1, wherein the camera unit comprises a camera lens, and the camera lens is capable of making images of objects and positioned within the opening to gather the incoming light.

3. The camera module as claimed in claim 2, wherein the through hole is substantially a hollow trumpet-shaped hole.

4. The camera module as claimed in claim 1, wherein when the light intensity sensor detects the light intensity of ambient light is less than a predetermined light intensity, the flash unit is automatically activated and enabled to provide light for the camera unit and illuminate a dark scene.

5. The camera module as claimed in claim 1, wherein the protective cover is made from rubber.

6. An electronic device comprising:
a housing;
a circuit board received in the housing and providing supports and connections for electronic components; and
a camera module located at the circuit board, the camera module comprising:
a camera unit recording and storing images;
a flash device providing light;
a light intensity sensor located between the camera unit and the flash device; and
a protective cover protecting the camera unit and the flash device, the protective cover comprising:
an opening partially exposing the camera unit and gathering incoming light;
a light hole partially exposing the flash device; and
a separation portion located between the opening and the light hole;
wherein the light from the flash device is diffused and passes through the light hole, and the camera unit and the flash device are spaced and separated by the separation portion to prevent the light of the flash device from directly entering camera unit through the opening; and
wherein a positioning hole passes through the separation portion, and the positioning hole is aligned with the light intensity sensor, and the light intensity sensor is partially exposed from the positioning hole.

7. The electronic device as claimed in claim 6, wherein the camera unit comprises a camera lens, and the camera lens is capable of making images of objects and is positioned within the opening to gather the incoming light.

8. The electronic device as claimed in claim 6, wherein the light hole comprises a receiving space and a through hole formed at the bottom of the receiving space, the receiving space receives the flash device, the through hole communicates with the receiving space and transfers and diffuses the light from the flash unit.

9. The electronic device as claimed in claim 8, wherein the through hole is a hollow trumpet-shaped hole.

10. The electronic device as claimed in claim 6, wherein when the light intensity sensor detects the light intensity of ambient light is less than a predetermined light intensity of the electronic device, the flash unit is automatically activated and enabled to provide light for the camera unit and illuminate a dark scene.

11. The camera module as claimed in claim 6, wherein the protective cover is made from rubber.

12. The electronic device as claimed in claim 6, further comprising a window plate, wherein the camera module is assembled to the circuit board, and the protective cover is held and secured between the circuit board and the window plate.

* * * * *